US011971676B2

(12) United States Patent
Watanabe et al.

(10) Patent No.: US 11,971,676 B2
(45) Date of Patent: Apr. 30, 2024

(54) IMAGE DENSITY MEASUREMENT METHOD AND IMAGE FORMING APPARATUS

(71) Applicant: KYOCERA Document Solutions Inc., Osaka (JP)

(72) Inventors: Masaru Watanabe, Osaka (JP); Yasuaki Sakamoto, Osaka (JP); Ayato Morikami, Osaka (JP); Kenichi Hayashi, Osaka (JP); Hideyuki Ogasawara, Osaka (JP); Yukiko Yoshimura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/161,783

(22) Filed: Jan. 30, 2023

(65) Prior Publication Data

US 2023/0244175 A1 Aug. 3, 2023

(30) Foreign Application Priority Data

Jan. 31, 2022 (JP) ................................ 2022-012555

(51) Int. Cl.
*G03G 15/00* (2006.01)

(52) U.S. Cl.
CPC ..... *G03G 15/5025* (2013.01); *G03G 15/5058* (2013.01)

(58) Field of Classification Search
CPC .......... G03G 15/5025; G03G 15/5041; G03G 15/5054; G03G 15/5058; G03G 15/5062
See application file for complete search history.

(56) References Cited

U.S. PATENT DOCUMENTS

2019/0018342 A1* 1/2019 Sakamoto .......... G03G 15/0808
2022/0137541 A1* 5/2022 Nakaiwa ............. G03G 15/043
399/52

FOREIGN PATENT DOCUMENTS

JP 2012093488 A 5/2012

* cited by examiner

*Primary Examiner* — Hoang X Ngo
(74) *Attorney, Agent, or Firm* — Alleman Hall & Tuttle LLP

(57) ABSTRACT

A processor derives a plurality of unit density values which are each an average value of sensed densities for each of a plurality of unit areas sectioned for each unit length in a test toner image. The processor derives a weighted average of the plurality of unit density values to derive a test image density used for adjusting a control parameter in a printing portion. The unit length is a greatest common factor of two target lengths corresponding to perimeters of two types of target rotating members out of the plurality of rotating members. When a number of the plurality of unit areas is represented by n, n is a value obtained by subtracting 1 from an added value of a first constant and a second constant. The first constant and the second constant are values obtained by respectively dividing the two target lengths by the unit length.

5 Claims, 5 Drawing Sheets

IMAGE DENSITY MEASUREMENT METHOD AND IMAGE FORMING APPARATUS

INCORPORATION BY REFERENCE

This application is based upon and claims the benefit of priority from the corresponding Japanese Patent Application No. 2022-012555 filed on Jan. 31, 2022, the entire contents of which are incorporated herein by reference.

BACKGROUND

The present disclosure relates to an image density measurement method for measuring a density of a test toner image used for adjusting a control parameter, and an image forming apparatus.

An image forming apparatus may include a printing portion that uses electrophotography. In this case, the printing portion forms a toner image on a surface of an image-carrying member and transfers the toner image onto a sheet.

In a case where the image forming apparatus is a tandem-type color image forming apparatus, the image-carrying member includes a photoconductor and an intermediate transfer belt. In this case, formation of an electrostatic latent image and development from the electrostatic latent image into the toner image are carried out on the surface of the photoconductor.

Further, the toner image formed on the surface of the photoconductor is transferred onto a surface of the intermediate transfer belt. Furthermore, the toner image formed on the surface of the intermediate transfer belt is transferred onto the sheet.

Moreover, the image forming apparatus may include a density sensing portion that senses a toner density on the surface of the intermediate transfer belt. For example, the density sensing portion senses a toner density of a portion on the surface of the intermediate transfer belt, that has passed through a transfer position.

For example, it is known that, when a patch image is formed on the surface of the intermediate transfer belt and the patch image is transferred onto the sheet, a gradation correction lookup table is corrected based on a sensing result of the density sensing portion.

The lookup table is an example of a control parameter in the printing portion. The patch image is an example of a test toner image used for adjusting the control parameter.

SUMMARY

An image density measurement method according to an aspect of the present disclosure is a method realized in an image forming apparatus. The image forming apparatus includes a printing portion and a density sensing portion. The printing portion includes a plurality of rotating members related to formation of toner images and is capable of forming a test toner image on a surface of a photoconductor. The density sensing portion is capable of sequentially sensing an image density of a portion of the test toner image, that passes through a predetermined sensing position. The image density measurement method includes deriving, by a processor, a plurality of unit density values which are each an average value of sensing densities sensed by the density sensing portion for each of a plurality of unit areas sectioned for each unit length in a sub scanning direction in the test toner image. The image density measurement method further includes deriving, by the processor, a weighted average of the plurality of unit density values to derive a test image density used for adjusting a control parameter in the printing portion. The unit length is a greatest common factor of two target lengths corresponding to perimeters of two types of target rotating members out of the plurality of rotating members. When a number of the plurality of unit areas is represented by n, n is a value obtained by subtracting 1 from an added value of a first constant and a second constant. The first constant is a value obtained by dividing a shorter one of the two target lengths by the unit length. The second constant is a value obtained by dividing a longer one of the two target lengths by the unit length.

An image forming apparatus according to another aspect of the present disclosure includes the printing portion, the density sensing portion, and the processor which realizes the image density measurement method.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the attached drawings. It is noted that the following embodiments are embodied examples of the present disclosure and do not limit the technical scope of the present disclosure.

First Embodiment

An image forming apparatus 10 according to an embodiment is an apparatus that executes print processing using electrophotography. The print processing is processing of forming an image on a sheet 9. The sheet 9 is an image forming medium such as a printing sheet and a sheet-type resin member.

[Configuration of Image Forming Apparatus 10]

Figure 1:
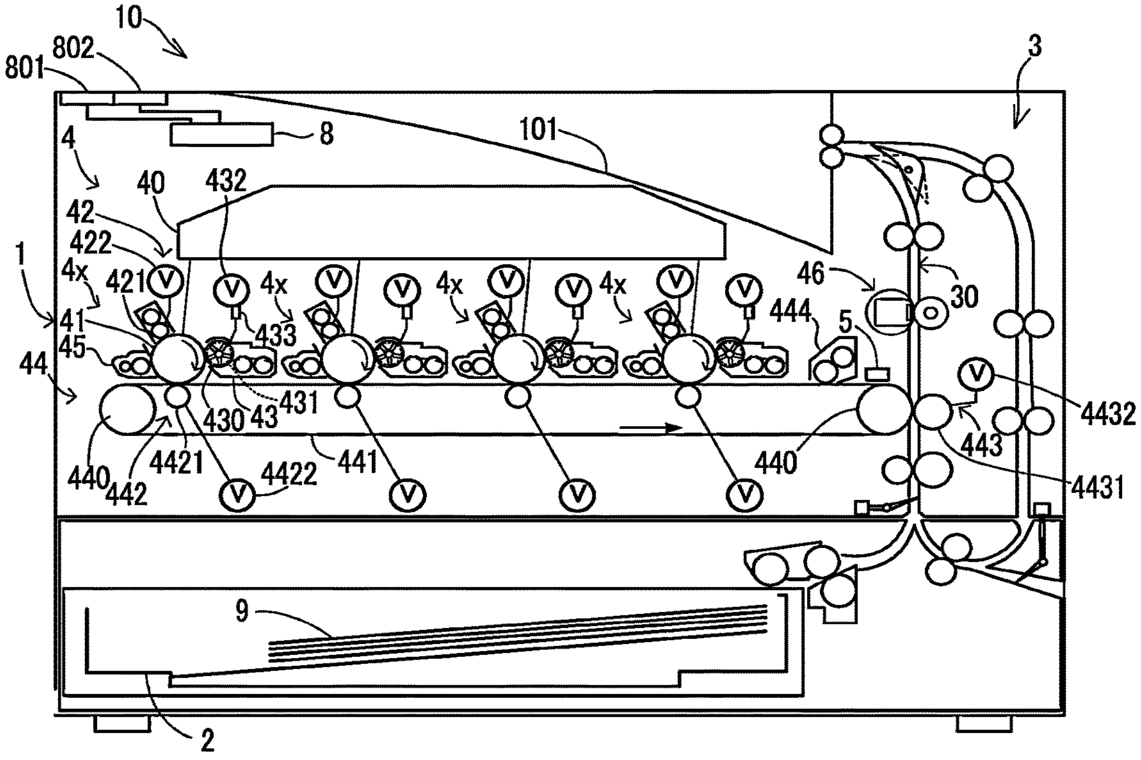
FIG. 1 is a configuration diagram of an image forming apparatus according to a first embodiment.

As shown in FIG. 1, the image forming apparatus 10 includes a sheet storing portion 2, a conveying path 30, a conveying device 3, and a printing device 4. The image forming apparatus 10 also includes an operation device 801, a display device 802, and a control device 8.

The conveying path 30, the conveying device 3, the printing device 4, and the control device 8 are accommodated in a housing 1.

The sheet storing portion 2 stores sheets 9. The conveying device 3 takes out a sheet 9 from the sheet storing portion 2 and feeds the sheet 9 to the conveying path 30, and further conveys the sheet 9 along the conveying path 30. In addition, the conveying device 3 discharges the sheet 9 on a discharge tray 101 from the conveying path 30.

The printing device 4 executes the print processing on the sheet 9 conveyed along the conveying path 30. In this embodiment, the printing device 4 is a tandem-type color printing device.

The printing device 4 forms a toner image on the sheet 9 conveyed along the conveying path 30. The toner image is an image that uses toner as developer. The toner is an example of granulated developer.

The printing device 4 includes a plurality of image forming portions 4*x*, a laser scanning unit 40, a transfer device 44, and a fixing device 46. In this embodiment, the printing device 4 includes four image forming portions 4*x* corresponding to four colors of yellow, cyan, magenta, and black.

Each of the image forming portions 4*x* includes a drum-type photoconductor 41, a charging device 42, a developing device 43, a drum cleaning device 45, and the like.

In each of the image forming portions 4*x*, the photoconductor 41 rotates so that a surface of the photoconductor 41 is charged by the charging device 42. Further, the laser scanning unit 40 scans beam light so as to form an electrostatic latent image on the surface of the rotating photoconductor 41.

The laser scanning unit 40 is an example of a latent image forming portion that forms the electrostatic latent image on the charged surface of the photoconductor 41.

In addition, the developing device 43 supplies the toner to the surface of the photoconductor 41 to thus develop the electrostatic latent image into the toner image. The developing device 43 supplies the toner to the photoconductor 41 at a developing position on an outer circumference of the photoconductor 41.

The charging device 42 includes a charging roller 421 and a charging voltage output device 422. The charging roller 421 is disposed so as to oppose the photoconductor 41 and rotates. The charging voltage output device 422 supplies a charging voltage to the charging roller 421.

The charging voltage is supplied from the charging voltage output device 422 to the photoconductor 41 via the charging roller 421. Thus, the surface of the photoconductor 41 is charged.

The developing device 43 includes a developing roller 431 and a bias output device 432. The developing roller 431 is disposed so as to oppose the photoconductor 41 at the developing position. The developing roller 431 rotates while carrying toner.

The developing device 43 further includes an interval retention member 430. The interval retention member 430 is formed integrally with the developing roller 431. The interval retention member 430 rotates while being in contact with the surface of the photoconductor 41 to retain an interval between the photoconductor 41 and the developing roller 431.

The bias output device 432 supplies a developing bias voltage to the developing roller 431. In this embodiment, the bias output device 432 supplies the developing bias voltage obtained by superimposing an AC voltage to a DC voltage, to the developing roller 431.

The developing roller 431 rotates while carrying toner, and supplies the toner to the surface of the photoconductor 41 at the developing position. The toner carried by the developing roller 431 is transferred to a portion of the electrostatic latent image on the surface of the photoconductor 41. Thus, the electrostatic latent image is developed into the toner image.

The transfer device 44 includes an intermediate transfer belt 441, four primary transfer devices 442 respectively corresponding to the four image forming portions 4*x*, a secondary transfer device 443, and a belt cleaning device 444.

The intermediate transfer belt 441 is supported by a plurality of supporting rollers 440. One of the plurality of supporting rollers 440 rotates by power from a motor (not shown). Thus, the intermediate transfer belt 441 rotates.

In the transfer device 44, the primary transfer devices 442 transfer the toner images respectively formed on the surfaces of the photoconductors 41 onto a surface of the intermediate transfer belt 441. Thus, the toner images of a plurality of colors are formed on the surface of the intermediate transfer belt 441.

Each of the primary transfer devices 442 includes a primary transfer roller 4421 and a primary current output device 4422. The primary transfer roller 4421 is disposed so as to oppose the photoconductor 41 via the intermediate transfer belt 441, and rotates.

The primary current output device 4422 supplies a primary transfer current to the primary transfer roller 4421. The toner image formed on the surface of the photoconductor 41 is transferred onto the surface of the intermediate transfer belt 441 by an electric field generated between the photoconductor 41 and the primary transfer roller 4421.

As described above, the printing device 4 forms the toner images on the surfaces of the four photoconductors 41. In addition, the printing device 4 transfers the toner images formed on the surfaces of the four photoconductors 41 onto the surface of the intermediate transfer belt 441.

The secondary transfer device 443 transfers the toner images formed on the intermediate transfer belt 441 onto the sheet 9. In descriptions below, the toner image to be transferred onto the sheet 9 will be referred to as a print toner image G10 (see FIG. 3).

The secondary transfer device 443 includes a secondary transfer member 4431 and a secondary current output device 4432. The secondary transfer member 4431 is in contact with the intermediate transfer belt 441. The sheet 9 is passed through between the intermediate transfer belt 441 and the secondary transfer member 4431.

The secondary current output device 4432 supplies a secondary transfer current to the secondary transfer member 4431. The print toner image G10 formed on the surface of the intermediate transfer belt 441 is transferred onto the sheet 9 by an electric field generated between the intermediate transfer belt 441 and the secondary transfer member 4431.

As described above, the transfer device 44 transfers the print toner images G10 formed on the surfaces of the four photoconductors 41 onto the sheet 9 via the intermediate transfer belt 441.

The drum cleaning device 45 removes waste toner remaining on the surface of the photoconductor 41. The belt cleaning device 444 removes the waste toner remaining on the intermediate transfer belt 441. The waste toner is generated along with the formation of the toner images in the printing device 4.

The fixing device 46 heats and pressurizes the print toner images G10 on the sheet 9. Thus, the fixing device 46 fixes the print toner images G10 onto the sheet 9.

The printing device 4 is an example of a printing portion capable of forming toner images on the surfaces of the photoconductors 41. The photoconductor 41, the charging roller 421, the interval retention member 430, the developing roller 431, and the primary transfer roller 4421 are each an example of a rotating member related to the formation of toner images.

The operation device 801 is a device that accepts user operations. For example, the operation device 801 includes operation buttons and a touch panel.

The display device 802 is a device that displays information. For example, the display device 802 includes a panel display device such as a liquid crystal display unit.

[Configuration of Control Device 8]

Figure 2:
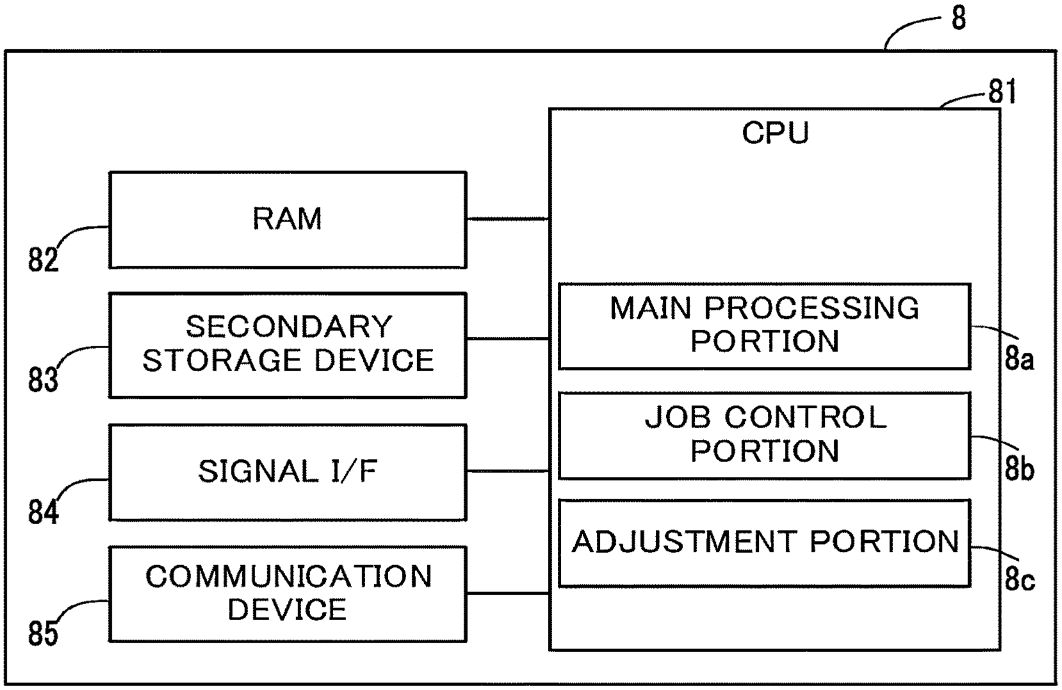
FIG. 2 is a block diagram showing a configuration of a control device in the image forming apparatus according to the first embodiment.

As shown in FIG. 2, the control device 8 includes a CPU (Central Processing Unit) 81, a RAM (Random Access Memory) 82, a secondary storage device 83, a signal interface 84, a communication device 85, and the like.

The secondary storage device 83 is a nonvolatile computer-readable storage device. The secondary storage device 83 is capable of storing and updating computer programs and various types of data. For example, one of or both of a flash memory and a hard disk drive is/are adopted as the secondary storage device 83.

The signal interface 84 converts signals output from various sensors into digital data, and transmits the digital data obtained by the conversion to the CPU 81. In addition, the signal interface 84 converts a control command output by the CPU 81 into a control signal, and transmits the control signal to a control target apparatus.

The communication device 85 communicates with other devices such as a host device (not shown). The CPU 81 communicates with the other devices via the communication device 85.

The CPU 81 is a processor that executes various types of data processing and control by executing the computer programs. The control device 8 including the CPU 81 controls the conveying device 3, the printing device 4, the display device 802, the communication device 85, and the like.

The RAM 82 is a volatile computer-readable storage device. The RAM 82 temporarily stores the computer programs to be executed by the CPU 81 and data to be output and referenced by the CPU 81 in a process of executing various types of processing.

The CPU 81 includes a plurality of processing modules that are realized by executing the computer programs. The plurality of processing modules include a main processing portion 8*a*, a job control portion 8*b*, an adjustment portion 8*c*, and the like.

The main processing portion 8*a* executes processing of causing various types of processing to be started in response to operations made with respect to the operation device 801, control of the display device 802, and the like.

The job control portion 8*b* controls the conveying device 3. Thus, the job control portion 8*b* controls the feed of the sheet 9 from the sheet storing portion 2 and the conveyance of the sheet 9 on the conveying path 30.

Further, the job control portion 8*b* controls the printing device 4. The job control portion 8*b* causes the printing device 4 to execute the print processing in synchronization with the conveyance of the sheet 9 by the conveying device 3.

The print processing includes processing of forming the print toner image G10 on the surface of each of the photoconductors 41. The print processing also includes processing of transferring the print toner image G10 onto the sheet 9 from the surface of each of the photoconductors 41 via the intermediate transfer belt 441.

Figure 3:
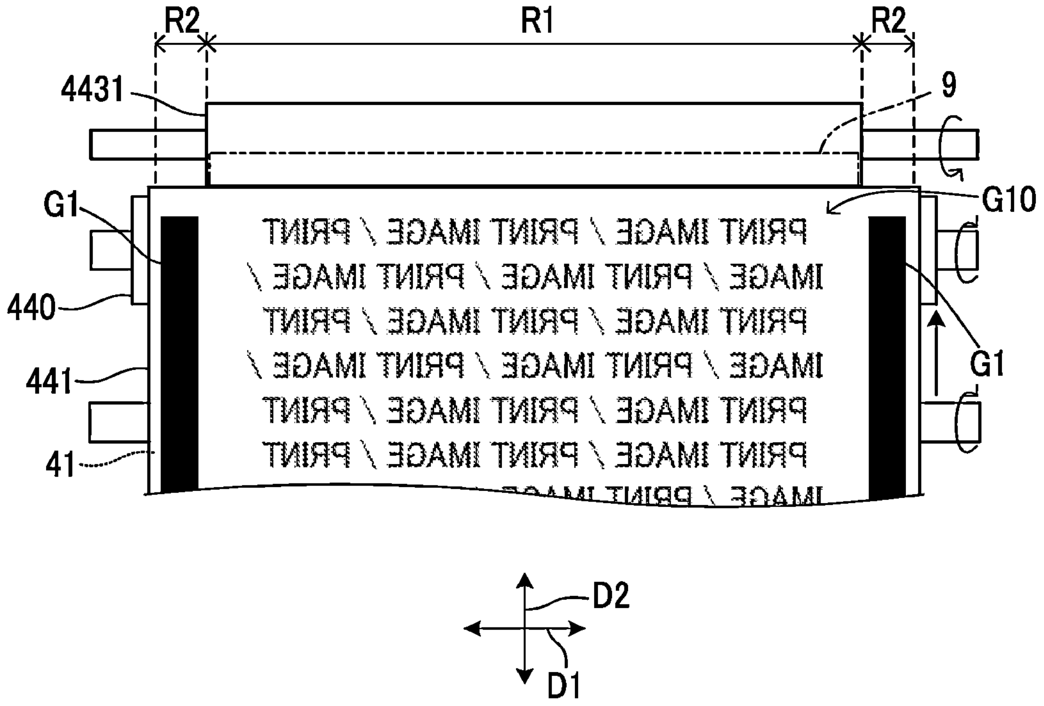
FIG. 3 is a diagram showing an intermediate transfer belt on which a print image and a test image are formed in the image forming apparatus according to the first embodiment.

In addition, the job control portion 8*b* is capable of causing the printing device 4 to execute processing of forming a test toner image G1 (see FIG. 3). In other words, the printing device 4 is capable of forming the test toner image G1 on the surface of the photoconductor 41.

The test toner image G1 is a toner image used for adjusting a control parameter in the printing device 4. For example, the test toner image G1 is a predetermined halftone pattern image. For convenience, in FIG. 3 to FIG. 7, the test toner images G1 are colored in black. The adjustment of the control parameter will be described later.

The image forming apparatus 10 further includes a density sensor 5 (see FIG. 1). The density sensor 5 is capable of sequentially sensing an image density of a portion of the test toner image G1, that passes through a predetermined sensing position. The density sensor 5 is an example of a density sensing portion.

Specifically, when the test toner image G1 passes through the sensing position, the density sensor 5 sequentially senses an image density of a linear area of the test toner image G1 along a main scanning direction D1.

In descriptions below, a sensing density sensed by the density sensor 5 for the linear area of the test toner image G1 will be referred to as a line sensing density.

In this embodiment, the sensing position is a position on a downstream side of the secondary transfer position in a rotation direction of the intermediate transfer belt 441. The density sensor 5 is, for example, CIS (Contact Image Sensor).

In the image forming apparatus 10, a width direction of the photoconductor 41 and the intermediate transfer belt 441 is the main scanning direction D1 (see FIG. 3). In addition, a direction along a movement direction of the surfaces of the rotating photoconductor 41 and intermediate transfer belt 441 is a sub scanning direction D2 (see FIG. 3).

The printing device 4 forms the print toner image G10 in a print area R1 on the surface of each of the photoconductors 41 in the main scanning direction D1. The print area R1 is an area corresponding to a width of the sheet 9.

For example, the print area R1 is an area occupied by the secondary transfer member 4431 that transfers the print toner image G10 onto the sheet 9 in the main scanning direction D1 (see FIG. 3).

In this embodiment, when forming the print toner image G10 in the print area R1 on the surface of each of the photoconductors 41, the printing device 4 can form the test toner images G1 in outer areas R2 on the surface of each of the photoconductors 41 (see FIG. 3).

The outer areas R2 are areas different from the print area R1. In other words, the outer areas R2 are areas outside the print area R1 in the main scanning direction D1.

Specifically, the printing device 4 forms the print toner image G10 and the test toner images G1 in different areas on the surface of each of the photoconductors 41 in the main scanning direction D1. At this time, the printing device 4 is capable of executing the processing of forming the print toner image G10 and the processing of forming the test toner images G1 in parallel.

More specifically, the printing device 4 executes parallel development processing when executing page print processing for forming an image on a single sheet 9. The parallel development processing is processing of forming, as well as form the print toner image G10 corresponding to a single sheet 9 in the print area R1 of each of the four photoconductors 41, the test toner images G1 in the outer areas R2 of a single target photoconductor.

The target photoconductor is one of the four photoconductors 41, and is sequentially selected from the four photoconductors 41 every time the page print processing is executed.

When causing the printing device 4 to execute the page print processing, the job control portion 8*b* causes the printing device 4 to execute the parallel development processing after selecting the target photoconductor.

The print toner image G10 is transferred onto the print area R1 on the surface of the intermediate transfer belt 441 from the print area R1 on the surface of each of the photoconductors 41. Further, the print toner image G10 is transferred onto the sheet 9 from the print area R1 on the surface of the intermediate transfer belt 441.

Meanwhile, the test toner images G1 are transferred onto the outer areas R2 on the surface of the intermediate transfer belt 441 from the outer areas R2 on the surface of each of the photoconductors 41. After that, the test toner images G1 reach the belt cleaning device 444 via the sensing position while being carried in the outer areas R2 on the surface of the intermediate transfer belt 441.

It is noted that the intermediate transfer belt 441 is an example of an intermediate transfer member onto which the test toner images G1 are transferred from the photoconductors 41.

The belt cleaning device 444 removes the test toner images G1 and the waste toner remaining in the print area R1 from the surface of the intermediate transfer belt 441.

The adjustment portion 8*c* adjusts the control parameter such that a difference between a density of the test toner image G1 sensed by the density sensor 5 and a target density becomes small.

For example, the control parameter includes one or more out of the charging voltage in the charging device 42, the developing bias voltage in the developing device 43, and an amount of the beam light in the laser scanning unit 40.

Incidentally, the printing device 4 that uses electrophotography includes a plurality of rotating members related to the formation of the toner images. In this embodiment, the plurality of rotating members include the photoconductor 41, the charging roller 421, the interval retention member 430, the developing roller 431, and the primary transfer roller 4421.

Variations of characteristics on surfaces of the plurality of rotating members may cause periodic density unevenness of the toner images in the sub scanning direction D2. When the periodic density unevenness is caused in the test toner image G1, there is a fear that the adjustment of the control parameter will be adversely affected.

Specifically, the density sensor 5 sequentially senses a density of a portion of the test toner image G1, that passes through the sensing position. Therefore, the sensing density of the density sensor 5 varies depending on the periodic density unevenness.

In addition, there may be a case where the length of the test toner image G1 in the sub scanning direction D2 is not a common multiple of perimeters of the plurality of rotating members. In this case, there is a fear that an average value of the sensing densities sensed by the density sensor 5 will vary every time the test toner image G1 is formed irrespective of the control parameter.

In a case where the density of the test toner image G1 derived based on the sensing densities sensed by the density sensor 5 varies due to the periodic density unevenness, there is a fear that the control parameter will be adjusted inappropriately.

In this embodiment, the print toner image G10 and the test toner images G1 are formed to be aligned in the main scanning direction D1 (see FIG. 3). In this case, the test toner images G1 are each formed with a length equal to or smaller than a length of the sheet 9 in the sub scanning direction D2.

Accordingly, in a case where the perimeters of the plurality of rotating members exceed the length of the sheet 9, the test toner images G1 cannot be formed with a length that is a common multiple of the perimeters of the plurality of rotating members. Thus, a problem that the control parameter is adjusted inappropriately due to the periodic density unevenness may arise.

Meanwhile, in control parameter adjustment processing to be described later, the adjustment portion 8*c* derives a test image density based on the sensing densities sensed by the density sensor 5. The test image density expresses a density of the test toner image G1 and is used for adjusting the control parameter.

Even in a case where the periodic density unevenness is caused in the test toner image G1 formed by the printing device 4, the adjustment portion 8*c* can appropriately derive the density of the test toner image G1.

Hereinafter, a method of deriving the density of the test toner image G1 based on the sensing densities sensed by the density sensor 5 will be described with reference to FIG. 4 to FIG. 7.

Figure 4:
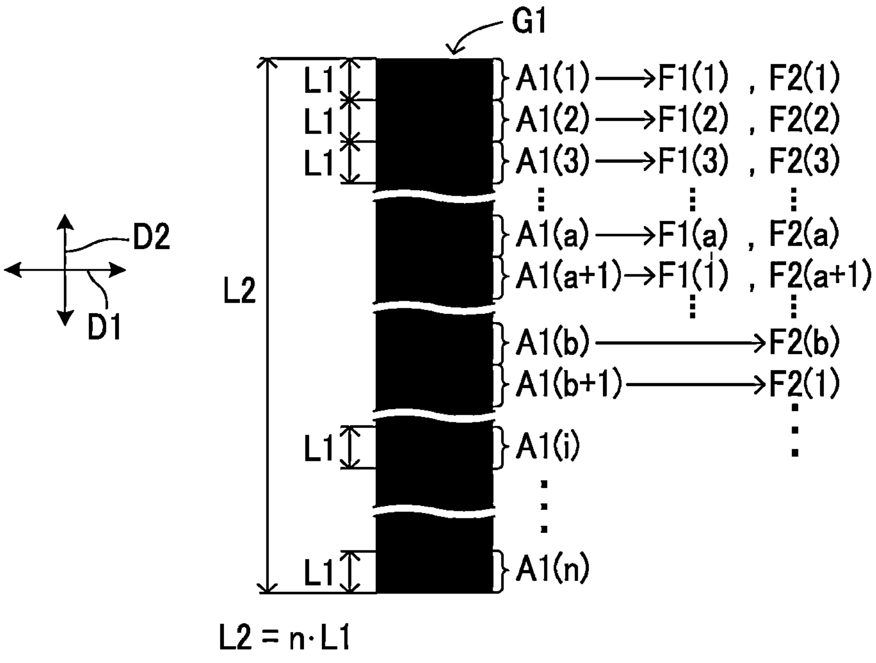
FIG. 4 is a diagram showing a relationship between a plurality of unit areas and periodic components of density unevenness in a test image formed by the image forming apparatus according to the first embodiment.

FIG. 4 shows that the test toner image G1 includes a plurality of unit areas A1 sectioned for each unit length L1 in the sub scanning direction D2. In FIG. 4, an identification number i is a number for identifying each of the plurality of unit areas A1. The identification number i is an integer of 1 or more.

The unit length L1 is a greatest common factor of two target lengths corresponding to perimeters of two types of target rotating members out of the plurality of rotating members. Two values that approximate the perimeters of the two types of target rotating members are preset as the two target lengths.

A shorter one of the two target lengths will be referred to as a first target length, and a longer one of the two target lengths will be referred to as a second target length. The two types of target rotating members include a first target rotating member corresponding to the first target length and a second target rotating member corresponding to the second target length.

The two types of target rotating members are, for example, the photoconductor 41 and the interval retention member 430 of the developing device 43. Hereinafter, a specific example of the unit length L1 in a case where the two types of target rotating members are the photoconductor 41 and the interval retention member 430 will be described.

For example, in a case where a perimeter of the interval retention member 430 is about 65 mm, the first target length may be set to be 64.4 mm. Moreover, in a case where a perimeter of the photoconductor 41 is about 94 mm, the second target length may be set to be 92.0 mm.

64.4 mm is an example of the length that approximates the perimeter of the interval retention member 430, and 92.0 mm is an example of the length that approximates the perimeter of the photoconductor 41.

The greatest common factor of 64.4 mm and 92.0 mm is 9.2 mm. Accordingly, in the case where the two target lengths are 64.4 mm and 92.0 mm, the unit length L1 is 9.2 mm.

Further, a value obtained by dividing the first target length by the unit length L1 is set as a first constant a. A value obtained by dividing the second target length by the unit length L1 is set as a second constant b.

The first constant a is an integer of 1 or more. The second constant b is an integer larger than the first constant a.

In other words, the first target length is a times the unit length L1, and the second target length is b times the unit length L1. In the above example where the unit length L1 is 9.2 mm, the first constant a is 7, and the second constant b is 10.

Herein, it is assumed that a+b−1=n is established. In other words, n is a value obtained by subtracting 1 from an added value of the first constant a and the second constant b.

The test toner image G1 is formed with a length equal to or larger than a reference length L2 in the sub scanning direction D2. The reference length L2 is n times the unit length L1 (see FIG. 4). The test toner image G1 includes n unit areas A1 sectioned in the sub scanning direction D2.

In descriptions below, the perimeters of the two types of target rotating members are assumed to be substantially equal to the two target lengths, respectively.

Densities of the unit areas A1(1) to A1 (*a*) in the test toner image G1 include first periodic components F1(1) to F(a) that are due to characteristics distribution of the first target rotating member in a circumferential direction (see FIG. 4). Similarly, densities of the unit areas A1(1) to A1 (*b*) include second periodic components F2(1) to F(b) that are due to characteristics distribution of the second target rotating member in a circumferential direction (see FIG. 4).

Moreover, the i-th first periodic component F1(*i*) and the (i+a)-th first periodic component F1(*i*+a) are the same component. Similarly, the i-th second periodic component F2(*i*) and the (i+b)-th second periodic component F2(*i*+b) are the same component.

In a case where the test toner image G1 is formed with a length that is a common multiple of the two target lengths, a density distribution of the test toner image G1 equally includes the first periodic components F1(1) to F(a) and the second periodic components F2(1) to F(b).

However, in the case where the test toner image G1 is formed with a length that is a common multiple of the two target lengths, there is a fear that the length of the test toner image G1 will exceed the length of the sheet 9. In this case, the length of the test toner image G1 exceeds an upper limit length of the test toner image G1 that can be formed by the parallel development processing.

In a case where the length of the test toner image G1 is smaller than the length that is a common multiple of the two target lengths, the density distribution of the test toner image G1 unequally includes the first periodic components F1(1) to F(a) and the second periodic components F2(1) to F(b).

Herein, the unit areas A1(1) to A1(*b*) are set as a group area A2(1), the unit areas A1(2) to A1(*b*+1) are set as a group area A2(2), and the unit areas A1(*j*) to A1(*j*+b−1) are set as a group area A2(*j*) (see FIG. 5). j is an integer of 1 or more.

Figure 5:
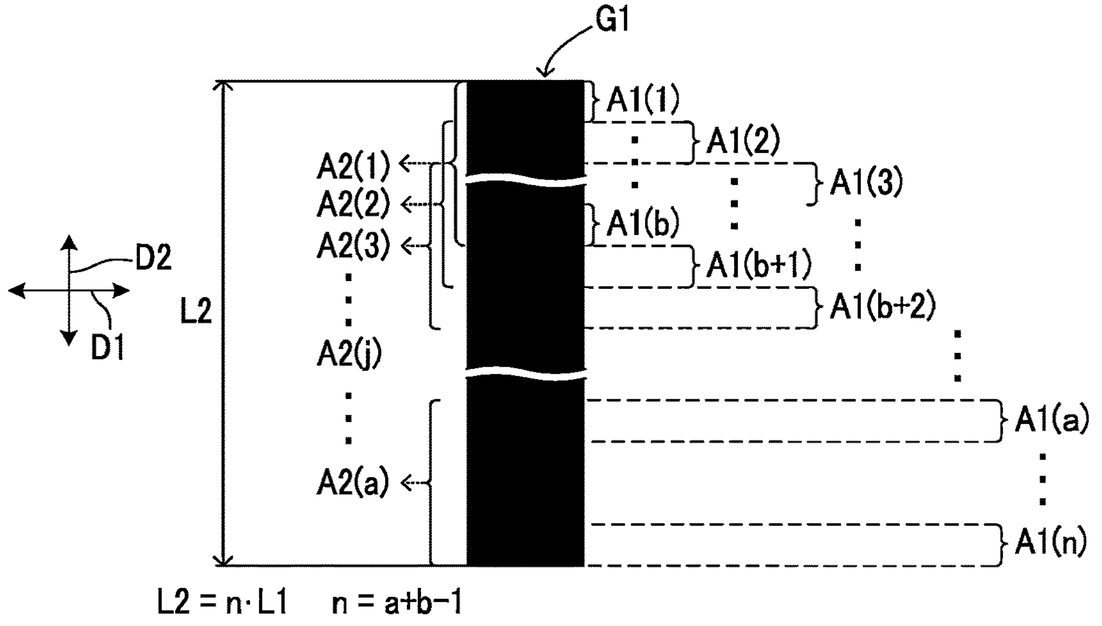
FIG. 5 is a diagram showing a relationship between the plurality of unit areas and a plurality of evaluation areas in the test image.

The n unit areas A1(1) to A1(*n*) are classified into a group areas A2(1) to A2(*a*) (see FIG. 5). Some of the n unit areas A1(1) to A1(*n*) belong to the a group areas A2(1) to A2(*a*) in an overlapping manner.

The a group areas A2(1) to A2(*a*) respectively include the second periodic components F2(1) to F(b) on a one-on-one basis (see FIG. 5).

Herein, average densities of the respective n unit areas A1(1) to A1(*n*) in the test toner image G1 are set to be unit density values ID(1) to ID(n). The n unit density values ID(1) to ID(n) are each an average value of the sensing densities sensed by the density sensor 5 for each of the plurality of unit areas A1.

Furthermore, sum values of b unit density values ID(j) to ID(j+b−1) in the respective a group areas A2(1) to A2(*a*) are set to be group sum values IDg(1) to IDg(a).

The a group sum values IDg(1) to IDg(a) are values on which the second periodic components F2(1) to F(b) are respectively reflected on a one-on-one basis (see FIG. 5). However, the a group sum values IDg(1) to IDg(a) are values on which the first periodic components F1(1) to F(a) are unequally reflected.

Figure 7:
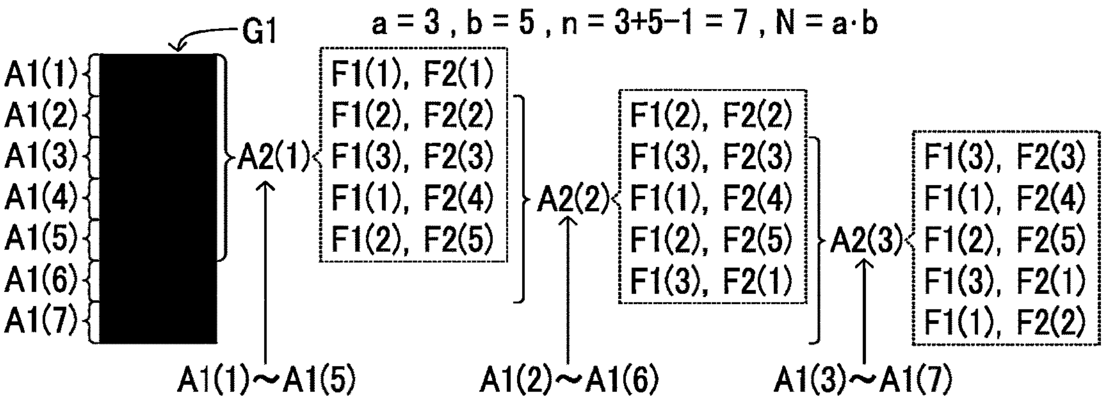
FIG. 7 is an explanatory diagram related to a specific example of a test image density derivation method in the image forming apparatus according to the first embodiment.

FIG. 7 shows an example of classifying, in a case where a=3, b=5, and N=7 are established, seven unit areas A1(1) to A1(7) of the test toner image G1 into three group areas A2(1) to A2(3).

Figure 6:
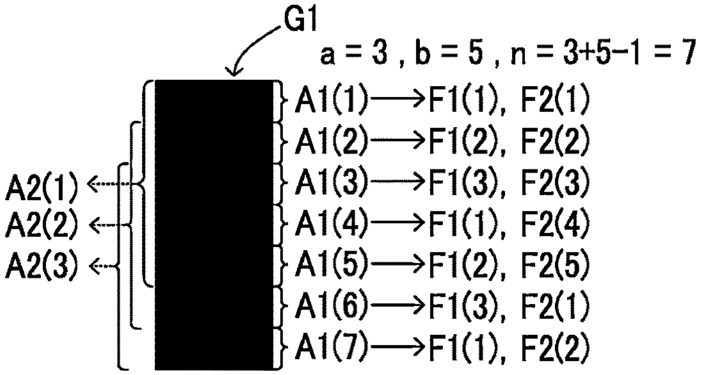
FIG. 6 is a diagram showing a specific example of a relationship among the plurality of unit areas, the plurality of evaluation areas, and the periodic components of density unevenness in the test image.

In addition, FIG. 6 and FIG. 7 each show a correspondence relationship among the three group areas A2(1) to A2(3), the three first periodic components F1(1) to F1(3), and the five second periodic components F2(1) to F2(5).

In the example shown in FIG. 7, the three group areas A2(1) to A2(3) as a whole include five sets of the three types of first periodic components F1(1) to F1(3). In addition, the three group areas A2(1) to A2(3) as a whole include three sets of the five types of second periodic components F2(1) to F2(5).

Specifically, a total value of the three group sum values IDg(1) to IDg(3) corresponding to the three group areas A2(1) to A2(3) is a value on which the three types of first periodic components F1(1) to F1(3) and the five types of second periodic components F2(1) to F2(5) are respectively and equally reflected.

Meanwhile, the three group areas A2(1) to A2(3) as a whole include one unit area A1(1), two unit areas A1(2), three unit areas A1(3), three unit areas A1(4), three unit areas A1(5), two unit areas A1(6), and one unit area A1(7).

Further, the three group areas A2(1) to A2(3) as a whole include a total of N unit areas A1(*i*). Herein, N is a value obtained by multiplying a and b.

Accordingly, a weighted average of the n unit density values ID(1) to ID(n), that is based on a predetermined weight coefficient, may be derived as the test image density. Herein, the weight coefficient is a ratio between N and the number of each of the n unit areas A1(1) to A1(*n*) included in the three group areas A2(1) to A2(3) as a whole.

Expression (1) below for deriving the test image density is a calculation expression obtained by generalizing the descriptions above.

[Expression 1]

-continued $$IDT = \frac{\sum_{i=1}^{a}(i \cdot ID(i)) + \sum_{i=a-1}^{b}(a \cdot ID(i)) + \sum_{i=b+1}^{n}((a+b-1) \cdot ID(i))}{N} \quad (1)$$

$$n = a + b - 1, N = a \cdot b$$

In Expression (1), IDT represents the test image density. n represents the number of the plurality of unit areas A1. i represents an identification number of the plurality of unit areas A1. ID(i) represents a density value corresponding to the i-th unit area A1(*i*) out of the n unit density values. a represents the first constant, and b represents the second constant larger than the first constant a.

As described above, the first constant a is a value obtained by dividing the first target length by the unit length L1. The second constant b is a value obtained by dividing the second target length by the unit length L1.

Expression (1) is an example of a calculation expression for deriving the weighted average of the n unit density values ID(1) to ID(n) as the test image density.

Alternatively, the test image density may be derived based on Expression (2) below. Expression (2) is an example of an alternative expression equivalent to Expression (1).

[Expression 2]

$$IDT = \frac{\sum_{j=1}^{a}\left(\sum_{i=j}^{j+b-1} ID(i)\right)}{N} \quad (2)$$

$$N = a \cdot b$$

It is noted that IDT, a, b, and N in Expression (2) are the same as IDT, a, b, and N in Expression (1).

By adopting Expression (1) or Expression (2), the weighted average of the n unit density values ID(1) to ID(n) is derived as the test image density. Thus, the plurality of first periodic components F1 and the plurality of second periodic components F2 are respectively and equally reflected on the test image density.

Moreover, the two target lengths approximate the perimeters of the two types of target rotating members. Therefore, an effect of a difference between the two target lengths and the perimeters of the two types of target rotating members on the test image density is small.

Accordingly, even in a case where the periodic density unevenness is caused in the test toner image G1, the effect of the periodic density unevenness on the test image density is small.

Further, an effect of a member having a relatively small perimeter out of the plurality of rotating members on ununiformity of the plurality of periodic components in the test toner image G1 is small.

Accordingly, of the plurality of rotating members, members that have relatively large perimeters and are likely to cause the periodic density unevenness are selected as the two types of target rotating members. The photoconductor 41 and the interval retention member 430 have relatively large perimeters among the plurality of rotating members.

It is noted that a specific member as a part of the plurality of rotating members may have a perimeter that approximates a length obtained by dividing the reference length L2 by an integer. An effect of such a specific member on the ununiformity of the plurality of periodic components in the test toner image G1 is also small.

[Control Parameter Adjustment Processing]

In this embodiment, the adjustment portion 8*c* executes the control parameter adjustment processing every time the page print processing is executed.

As described above, every time the page print processing is executed, the test toner images G1 are formed on the outer areas R2 on the surface of the target photoconductor.

Hereinafter, exemplary procedures of the control parameter adjustment processing will be described with reference to the flowchart shown in FIG. 8. It is noted that the control parameter adjustment processing includes processing for realizing an image density measurement method.

In descriptions below, S1, S2, . . . represent identification symbols of a plurality of steps in the control parameter adjustment processing. In the control parameter adjustment processing, processing of Step S1 is executed first.

<Step S1>

In Step S1, the adjustment portion 8*c* counts up the identification number i. When the processing of Step S1 is executed for the first time, i that has been counted up is 1.

After executing the processing of Step S1, the adjustment portion 8*c* shifts the processing to Step S2.

<Step S2>

In Step S2, the adjustment portion 8*c* acquires the plurality of line sensing densities corresponding to the i-th unit area A1(*i*) from the density sensor 5. The adjustment portion 8*c* executes the processing of Step S2 when the test toner image G1 passes through the sensing position.

After executing the processing of Step S2, the adjustment portion 8*c* shifts the processing to Step S3.

<Step S3>

In Step S3, the adjustment portion 8*c* derives an i-th unit density value ID(i) which is an average value of the plurality of line sensing densities for the i-th unit area A1(*i*).

After executing the processing of Step S3, the adjustment portion 8*c* shifts the processing to Step S4.

<Step S4>

In Step S4, the adjustment portion 8*c* determines whether or not n unit density values ID(1) to ID(n) have been derived.

When determined that the n unit density values ID(1) to ID(n) have not yet been derived, the adjustment portion 8*c* shifts the processing to Step S1. Thus, the adjustment portion 8*c* repeats the processing of Step S1 to Step S3 n times.

Accordingly, the adjustment portion 8*c* derives the n unit density values ID(1) to ID(n) which are each an average value of the sensing densities sensed by the density sensor 5 for each of the n unit areas A1(1) to A1(*n*) (Step S3).

On the other hand, when determined that the n unit density values ID(1) to ID(n) have been derived, the adjustment portion 8*c* shifts the processing to Step S5.

<Step S5>

In Step S5, the adjustment portion 8*c* derives a test image density IDT based on the n unit density values ID(1) to ID(n).

Specifically, the adjustment portion 8*c* applies the n unit density values ID(1) to ID(n) to Expression (1) or Expression (2) above to derive the test image density IDT (Step S5).

It is noted that the processing of Step S5 is an example of processing of deriving a weighted average of the n unit density values ID(1) to ID(n) to derive the test image density IDT. In addition, the processing of Step S1 to Step S5 is an example of processing for realizing the image density measurement method in the image forming apparatus 10.

After executing the processing of Step S5, the adjustment portion 8*c* shifts the processing to Step S6.

<Step S6>

In Step S6, the adjustment portion 8*c* shifts the processing to Step S7 in a case where the test image density IDT falls outside a predetermined target range.

On the other hand, in a case where the test image density IDT falls within the target range, the adjustment portion 8*c* ends the control parameter adjustment processing.

<Step S7>

In Step S7, the adjustment portion 8*c* adjusts the control parameter according to a density difference which is a difference between the test image density IDT and the target range.

For example, the control parameter to be adjusted includes one or more out of the charging voltage in the charging device 42, an amount of the beam light in the laser scanning unit 40, and the developing bias voltage in the developing device 43.

Further, the control parameter adjusted in Step S7 is a parameter corresponding to the target photoconductor that is selected every time the page print processing is executed.

After executing the processing of Step S7, the adjustment portion 8*c* ends the control parameter adjustment processing.

By adopting the control parameter adjustment processing, even in a case where the periodic density unevenness is caused in the test toner image G1, the density of the test toner image G1 can be derived appropriately.

Moreover, the reference length L2 of the test toner image G1 is smaller than a length which is a least common multiple of the two target lengths. Therefore, the control parameter adjustment processing can be adopted in many cases where the length of the test toner image G1 is restricted.

Second Embodiment

Next, an image forming apparatus 10A according to a second embodiment will be described with reference to FIG. 9.

Figure 9:
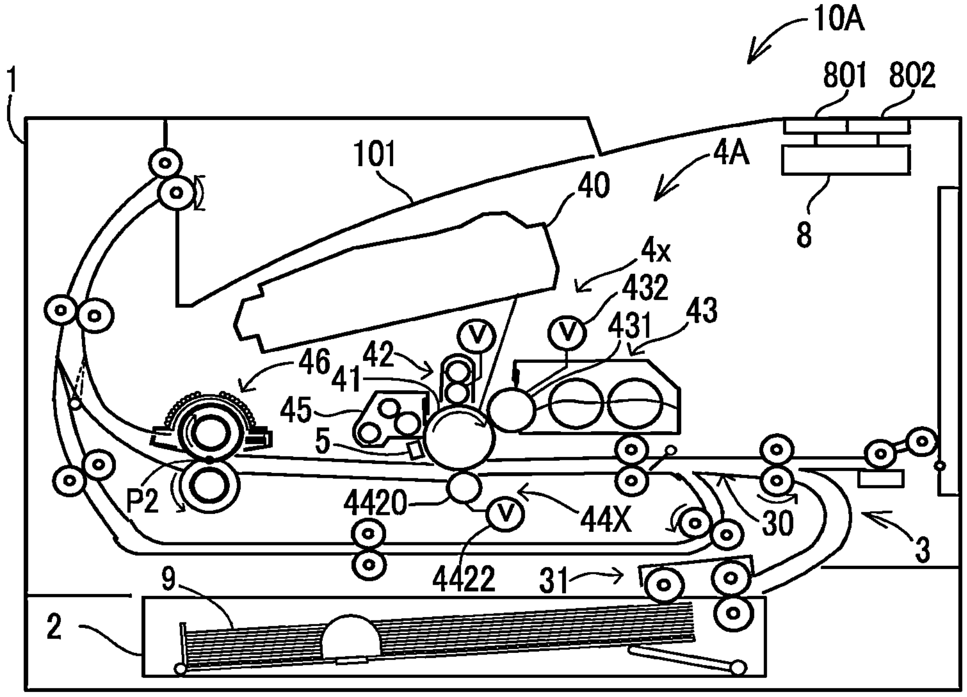
FIG. 9 is a configuration diagram of an image forming apparatus according to a second embodiment.

In FIG. 9, constituent elements that are the same as those shown in FIG. 1 are denoted by the same reference numerals. Hereinafter, points of the image forming apparatus 10A different from those of the image forming apparatus 10 will be described.

The image forming apparatus 10A includes a printing device 4A capable of forming only a monochrome image. The printing device 4A has a configuration in which the four image forming portions 4*x* and the transfer device 44 in the printing device 4 of the image forming apparatus 10 are replaced with one image forming portion 4*x* and a transfer device 44X.

The one image forming portion 4*x* carries out the formation of the electrostatic latent image and the development from the electrostatic latent image into the toner image, on the surface of the photoconductor 41.

The transfer device 44X transfers the toner image formed on the surface of the photoconductor 41 onto the sheet 9. The transfer device 44X is an example of a transfer portion that transfers the toner image onto the sheet 9 from the image-carrying member.

In the image forming apparatus 10A, the density sensor 5 senses the densities of the test toner images G1 formed in the outer areas R2 on the surface of the photoconductor 41.

The sensing position in the image forming apparatus 10A is a position on a downstream side of a position of the transfer device 44X on an outer circumference of the photoconductor 41, in a rotation direction of the photoconductor 41.

Figure 8:
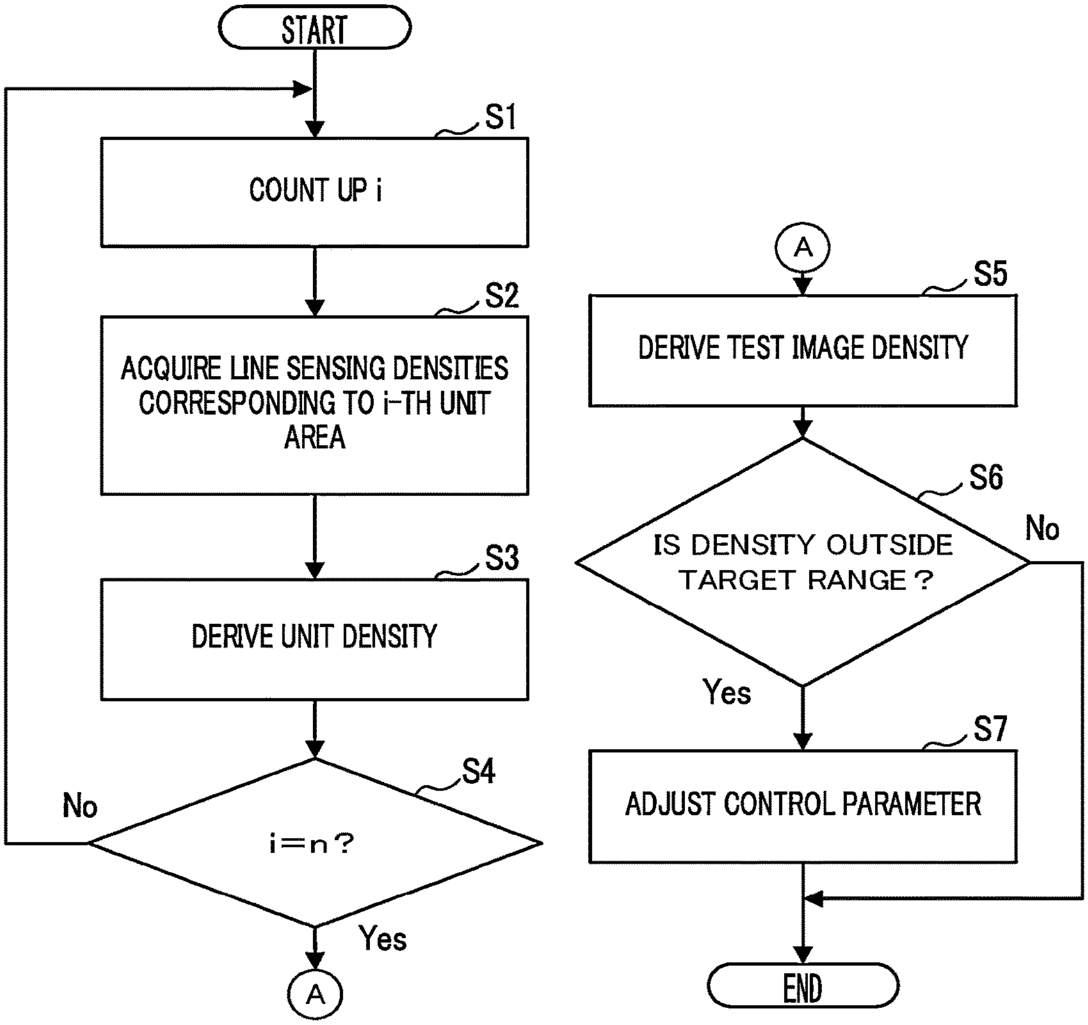
FIG. 8 is a flowchart showing exemplary procedures of control parameter adjustment processing in the image forming apparatus according to the first embodiment.

Further, the adjustment portion 8*c* of the image forming apparatus 10A also executes the control parameter adjustment processing (see FIG. 8). It is noted that in the image forming apparatus 10A, the image forming portion 4*x* includes one photoconductor 41. Accordingly, in the image forming apparatus 10A, processing of selecting the target photoconductor is omitted.

Also when adopting the image forming apparatus 10A, effects similar to those of the case where the image forming apparatus 10 is adopted are obtained.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image density measurement method in an image forming apparatus including a printing portion which includes a plurality of rotating members related to formation of toner images and is capable of forming a test toner image on a surface of a photoconductor, and a density sensing portion capable of sequentially sensing an image density of a portion of the test toner image, that passes through a predetermined sensing position, the image density measurement method comprising:

deriving, by a processor, a plurality of unit density values which are each an average value of sensing densities sensed by the density sensing portion for each of a plurality of unit areas sectioned for each unit length in a sub scanning direction in the test toner image; and deriving, by the processor, a weighted average of the plurality of unit density values to derive a test image density used for adjusting a control parameter in the printing portion, wherein the unit length is a greatest common factor of two target lengths corresponding to perimeters of two types of target rotating members out of the plurality of rotating members, when a number of the plurality of unit areas is represented by n, n is a value obtained by subtracting 1 from an added value of a first constant and a second constant, and the first constant and the second constant are values obtained by respectively dividing the two target lengths by the unit length.

2. The image density measurement method according to claim 1, wherein the processor derives the test image density by applying the plurality of unit density values to a calculation expression below or to an alternative expression equivalent to the calculation expression below,

[Expression 1]

$$IDT = \frac{\sum_{t=1}^{a}(i \cdot ID(i)) + \sum_{i=a-1}^{b}(a \cdot ID(i)) + \sum_{i=b+1}^{n}((a+b-1) \cdot ID(i))}{N} \quad (1)$$

$$n = a + b - 1,\ N = a \cdot b$$

where, in the calculation expression, IDT represents the test image density, i represents an identification number of the plurality of unit areas, ID(i) represents a density value corresponding to an i-th unit area out of the plurality of unit density values, a represents the first constant obtained by dividing a shorter one of the two target lengths by the unit length, and b represents the second constant obtained by dividing a longer one of the two target lengths by the unit length.

3. The image density measurement method according to claim 1, wherein when the printing portion includes a developing roller which supplies toner to the surface of the photoconductor, an interval retention member which is formed integrally with the developing roller and retains an interval between the photoconductor and the developing roller by rotating while being in contact with the surface of the photoconductor, and an intermediate transfer member onto which the test toner image is transferred from the photoconductor, the two types of target rotating members are the photoconductor and the interval retention member.

4. An image forming apparatus, comprising:

a printing portion which includes a plurality of rotating members related to formation of toner images and is capable of forming a test toner image on a surface of a photoconductor;

a density sensing portion capable of sequentially sensing an image density of a portion of the test toner image, that passes through a predetermined sensing position; and a processor which realizes the image density measurement method according to claim 1.

5. The image forming apparatus according to claim 4, wherein the printing portion is capable of forming, when forming a print toner image to be transferred onto a sheet in a print area corresponding to a width of the sheet on the surface of the photoconductor, the test toner image in an outer area different from the print area on the surface of the photoconductor.

* * * * *